(12) United States Patent
Lee et al.

(10) Patent No.: US 7,224,422 B2
(45) Date of Patent: May 29, 2007

(54) MULTI-DOMAIN LIQUID CRYSTAL DISPLAY DEVICE AND METHOD FOR MANUFACTURING THE SAME

(75) Inventors: Yun Bok Lee, Seoul (KR); Yong Sung Ham, Anyang-shi (KR)

(73) Assignee: LG.Phillips LCD Co., Ltd., Seoul (KR)

(*) Notice: Subject to any disclaimer, the term of this patent is extended or adjusted under 35 U.S.C. 154(b) by 0 days.

(21) Appl. No.: 10/655,221

(22) Filed: Sep. 5, 2003

(65) Prior Publication Data

US 2004/0119923 A1   Jun. 24, 2004

(30) Foreign Application Priority Data

Dec. 23, 2002 (KR) .................. 10-2002-0082534

(51) Int. Cl.
*G02F 1/1337* (2006.01)
*G02F 1/1335* (2006.01)

(52) U.S. Cl. .................. 349/129; 349/106; 349/130; 349/123

(58) Field of Classification Search ................ 349/129, 349/106, 130, 123
See application file for complete search history.

(56) References Cited

U.S. PATENT DOCUMENTS 5,263,888 A * 11/1993 Ishihara et al. .............. 445/25
6,219,126 B1 * 4/2001 Von Gutfeld .............. 349/153
6,583,837 B1 * 6/2003 Fukumoto et al. .......... 349/129
6,636,290 B1 * 10/2003 Glownia et al. ............ 349/187
6,650,390 B2 * 11/2003 Sakamoto et al. .......... 349/143
6,654,084 B1 * 11/2003 Marukawa et al. ......... 349/110
6,657,695 B1 * 12/2003 Song et al. ................. 349/143
6,710,837 B1 * 3/2004 Song et al. ................. 349/143
6,822,723 B2 * 11/2004 Song et al. ................. 349/178
6,897,928 B2 * 5/2005 Jang-kun .................... 349/129
2001/0007487 A1 * 7/2001 Yoon et al. ................. 349/106

FOREIGN PATENT DOCUMENTS

| KR | 1999-0006951 B1 | 1/1999 |
|---|---|---|
| KR | 2001-0087321 A | 9/2001 |
| KR | 2002-0010211 A | 2/2002 |

* cited by examiner

*Primary Examiner*—Mike Qi
(74) *Attorney, Agent, or Firm*—Birch, Stewart, Kolasch & Birch, LLP

(57) ABSTRACT

A multi-domain LCD device and a method for manufacturing the same are provided, in which it is possible to prevent an opening from being asymmetrical due to the bonding of margins of two substrates, thereby stabilizing peak transmittance characteristics and obtaining a wide viewing angle. The multi-domain LCD device includes first and second substrate being opposite to each other, a color filter layer having an opening on the first substrate, an insulating layer on the entire surface of the first substrate including the color filter layer, a first alignment layer on the insulating layer, a protrusion on the second substrate and corresponding to the opening of the first substrate, a second alignment layer on the entire surface of the second substrate including the protrusion, and a liquid crystal layer between the first and second substrates.

23 Claims, 5 Drawing Sheets

TFT & Passivation Layer

MULTI-DOMAIN LIQUID CRYSTAL DISPLAY DEVICE AND METHOD FOR MANUFACTURING THE SAME

BACKGROUND OF THE INVENTION

This non-provisional application claims priority under 35 U.S.C. § 119(a) on Patent Application No. 10-2002-0082534 filed in Republic of Korea on Dec. 23, 2002, the entire contents of which are herein incorporated by reference.

1. Field of the Invention

The present invention relates to a multi-domain liquid crystal display (LCD) device and a method for manufacturing the same, and more particularly to a multi-domain LCD device and a method for manufacturing the same suitable for improving a peak transmittance.

2. Discussion of Related Art

With development of information society, demands for various display devices increase. Accordingly, much effort has been made to research and develop various flat display devices such as liquid crystal display (LCD), plasma display panel (PDP), electro luminescent display (ELD), and vacuum fluorescent display (VFD). Some species of the flat display devices are already applied to displays of various equipments.

Among the various flat display devices, the liquid crystal display (LCD) device has been most widely used due to the advantageous characteristics of thinness, lightness in weight, and low power consumption, whereby the LCD device substitutes for a cathode ray tube (CRT). In addition to the mobile type LCD devices such as a display for a notebook computer, the LCD devices have been developed for computer monitors and televisions to receive and display broadcasting signals.

Despite various technical developments in the LCD technology with applications in different fields, research in enhancing the picture quality of the LCD device has been in some respects lacking as compared to other features and advantages of the LCD device. In order to use the LCD device in various fields as a general display, the key to developing the LCD device lies on whether the LCD device can implement a high quality picture, such as high resolution and high luminance with a large-sized screen while still maintaining lightness in weight, thinness, and low power consumption.

Generally, an LCD device includes an LCD panel for displaying a picture image, and a driving part for applying a driving signal to the LCD panel. The LCD panel includes first and second glass substrates bonded to each other at a predetermined interval, and a liquid crystal layer injected between the first and second glass substrates.

The first glass substrate (TFT array substrate) includes a plurality of gate and data lines, a plurality of pixel electrodes, and a plurality of thin film transistors. At this time, the plurality of gate lines are formed on the first glass substrate at fixed intervals in one direction, and the plurality of data lines are formed at fixed intervals in perpendicular to the plurality of gate lines. Then, the plurality of pixel electrodes of a matrix arrangement are respectively formed in pixel regions defined by the plurality of gate and data lines crossing each other. The plurality of thin film transistors are switched according to signals of the gate lines for transmitting signals of the data lines to the respective pixel electrodes.

The second glass substrate (color filter substrate) includes a black matrix layer excluding light from regions except the pixel regions of the first substrate, R/G/B color filter layer displaying various colors, and a common electrode displaying the picture image. In case of an In-Plane Switching (IPS) mode LCD device, the common electrode is formed on the first glass substrate.

Next, a predetermined space is maintained between the first and second glass substrates by spacers, and the first and second substrates are bonded to each other by a sealant pattern having a liquid crystal injection inlet. At this time, the liquid crystal layer is formed according to a liquid crystal injection method, in which the liquid crystal injection inlet is dipped into a container having liquid crystal while maintaining a vacuum state in the predetermined space between the first and second glass substrates. That is, the liquid crystal is injected between the first and second substrates by an osmotic action. Then, the liquid crystal injection inlet is sealed with the sealant.

The LCD device is driven according to optical anisotropy and polarizability of liquid crystal. At this time, liquid crystal molecules are aligned with directional characteristics since the liquid crystal molecules respectively have long and thin shapes. In this respect, an electric field is applied to the liquid crystal for controlling the alignment direction of the liquid crystal molecules. That is, if the alignment direction of the liquid crystal molecules is controlled by the electric field, the light is polarized and changed by the optical anisotropy of the liquid crystal, thereby displaying the picture image.

The liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal axis of a positive (+) liquid crystal molecule is in parallel to the electric field applied to the liquid crystal. Meanwhile, in the negative (−) type liquid crystal, a longitudinal axis of a negative (−) liquid crystal molecule is in perpendicular to the electric field applied to the liquid crystal.

Figure 1:
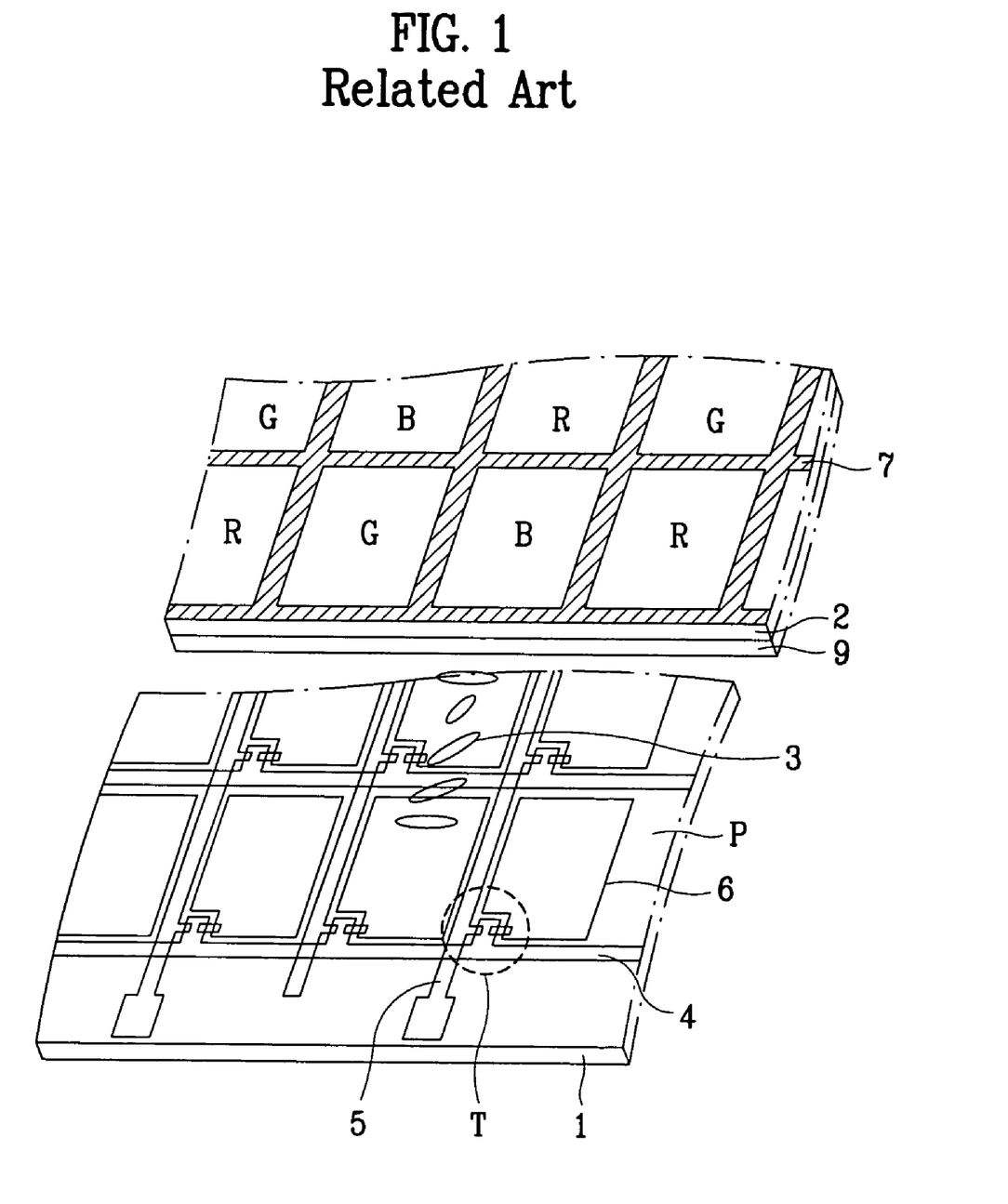
FIG. 1 is an exploded perspective view illustrating some parts of a TN-mode LCD device according to the related art.

FIG. 1 is an exploded perspective view illustrating some parts of a related art LCD device. As shown in FIG. 1, the related art LCD device includes lower and upper substrates 1 and 2 bonded to each other at a predetermined interval, and a liquid crystal layer 3 injected between the lower and upper substrates 1 and 2.

More specifically, the lower substrate 1 includes a plurality of gate lines 4, a plurality of data lines 5, a plurality of pixel electrodes 6, and a plurality of thin film transistors T. At this time, the plurality of gate lines 4 are formed on the lower substrate 1 in one direction at fixed intervals, and then the plurality of data lines 5 are formed in perpendicular to the plurality of gate lines 4 at fixed intervals, thereby defining a plurality of pixel regions P. Subsequently, the plurality of pixel electrodes 6 are respectively formed in the pixel regions P defined by the plurality of gate and data lines 4 and 5 crossing each other, and the plurality of thin film transistors T are respectively formed at crossing points of the plurality of gate and data lines 4 and 5. Also, the upper substrate 2 includes a black matrix layer 7 excluding light from regions except the pixel regions P, R/G/B color filter layer 8 for displaying various colors, and a common electrode 9 for displaying a picture image.

Herein, each thin film transistor T includes a gate electrode extending from the corresponding gate line 4, a gate insulating layer (not shown) on an entire surface of the lower substrate 1, an active layer on the gate insulating layer above the gate electrode, a source electrode protruding from the corresponding data line 5, and a drain electrode positioned opposite to the source electrode. Each pixel electrode 6 is formed of a transparent conductive metal having great light transmittance such as Indium-Tin-Oxide (ITO).

In the aforementioned LCD device, the liquid crystal layer 3 is aligned on the pixel electrode 6 by a signal applied from the thin film transistor T, and the light transmittance transmitting the liquid crystal layer 3 is controlled according to the alignment level of the liquid crystal layer 3, thereby displaying the picture image. The aforementioned LCD device drives the liquid crystal according to the electric field formed in perpendicular to the lower and upper substrates, in which transmissivity and aperture characteristics are great. Also, it is possible to prevent liquid crystal cells from being damaged due to static electricity in that the common electrode 9 of the upper substrate 2 serves as a ground.

Hereinafter, a related art multi-domain LCD device will be described with reference to the accompanying drawings.

Figure 2:
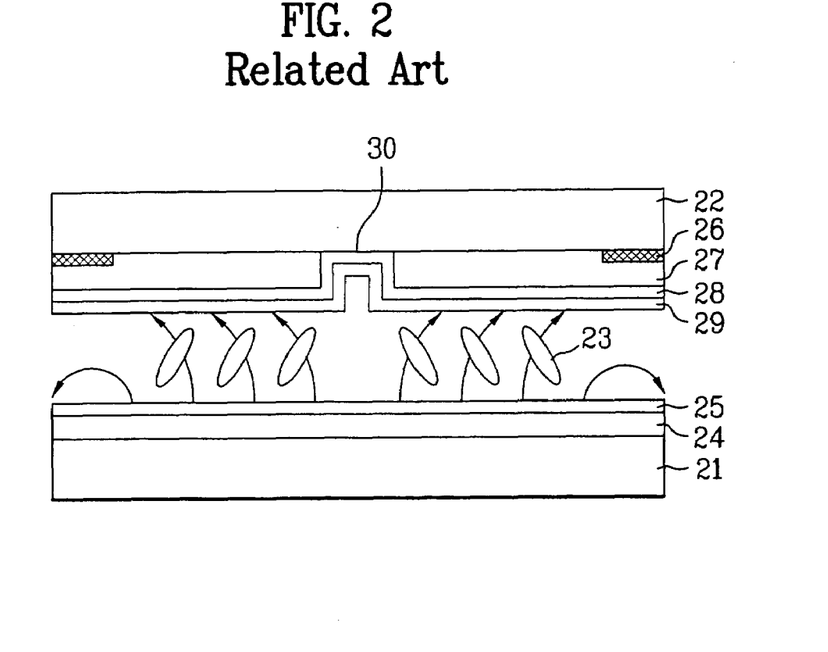
FIG. 2 is a cross-sectional view illustrating a unit pixel of a multi-domain LCD device according to the related art.

FIG. 2 is a cross-sectional view illustrating a unit pixel of a related art multi-domain LCD device. As shown in FIG. 2, the related art multi-domain LCD device includes lower and upper substrates 21 and 22 being opposite to each other at a predetermined interval, and a liquid crystal layer 23 formed between the lower and upper substrates 21 and 22.

The lower substrate 21 includes a plurality of gate and data lines, a thin film transistor TFT, a passivation layer, a pixel electrode 24, and a first alignment layer 25. The plurality of gate and data lines crossing each other are formed on the lower substrate 21 to define a plurality of pixel regions. Also, the thin film transistor TFT having a gate electrode, a gate insulating layer, a semiconductor layer, an ohmic contact layer and source/drain electrodes is formed in the pixel region. Then, the passivation layer is formed on the entire surface of the lower substrate 21, and the pixel electrode 24 is formed on the passivation layer for being connected to the drain electrode. The first alignment layer 25 is formed on the entire surface of the lower substrate 21 including the pixel electrode 24.

The upper substrate 22 includes a black matrix layer 26 preventing light from leaking in the lower substrate 21 corresponding to the gate line, the data line and the thin film transistor, a color filter layer 27 formed on the entire surface of the upper substrate 22 including the black matrix layer 26, a common electrode 28 on the color filter layer 27, and a second alignment layer 29 on the common electrode 28.

Meanwhile, in the related art multi-domain LCD device, an opening 30 is formed in the color filter layer 27, thereby obtaining multi-domains. At this time, the opening 30 is formed when forming the color filter layer 27, and a VA mode is applied thereto, thereby forming a wide viewing angle.

However, the related art multi-domain LCD device has the following disadvantages. That is, the opening 30 is formed in the color filter layer of the upper substrate, whereby the opening may be asymmetrical by bonding margins of the lower and upper substrates. As a result, peak transmittance is unstable.

SUMMARY OF THE INVENTION

Accordingly, the present invention is directed to a multi-domain LCD device and a method for manufacturing the same that substantially obviates one or more problems due to limitations and disadvantages of the related art.

An object of the present invention is to provide a multi-domain LCD device and a method for manufacturing the same, in which it is possible to prevent an opening from being asymmetrical by bonding margins of upper and lower substrates, thereby stabilizing peak transmittance characteristics and obtaining a wide viewing angle.

Additional advantages, objects, and features of the invention will be set forth in part in the description which follows and in part will become apparent to those having ordinary skill in the art upon examination of the following or may be learned from practice of the invention. The objects and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-domain LCD device according to an aspect of the present invention includes first and second substrate being opposite to each other; a color filter layer having an opening on the first substrate; an insulating layer on an entire surface of the first substrate including the color filter layer; a first alignment layer on the insulating layer; a protrusion on the second substrate and corresponding to the opening of the first substrate; a second alignment layer on an entire surface of the second substrate including the protrusion; and a liquid crystal layer between the first and second substrates.

Also, a thin film transistor, a passivation layer and a pixel electrode are formed between the insulating layer and the first alignment layer. The protrusion is formed of an insulator. A common electrode is formed on the second substrate.

In another aspect, a method for manufacturing a multi-domain LCD device includes providing first and second substrates being opposite to each other; forming a color filter layer having an opening on the first substrate; forming an insulating layer on an entire surface of the first substrate including the color filter layer; forming a first alignment layer on the insulating layer; forming a protrusion on the second substrate corresponding to the opening of the first substrate; forming a second alignment layer on an entire surface of the second substrate including the protrusion; and forming a liquid crystal layer between the first and second substrates.

The method further includes a step of forming a thin film transistor array on the insulating layer of the first substrate before forming the first alignment layer. The protrusion is formed of any one of acrylic resin, BCB and black resin. The method further includes a step of forming a common electrode on the entire surface of the second substrate before forming the protrusion.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4A to FIG. 4E are cross-sectional views illustrating manufacturing process steps of a multi-domain LCD device according to an embodiment the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a multi-domain LCD device and a method for manufacturing the same will be described with reference to the accompanying drawings.

Figure 3:
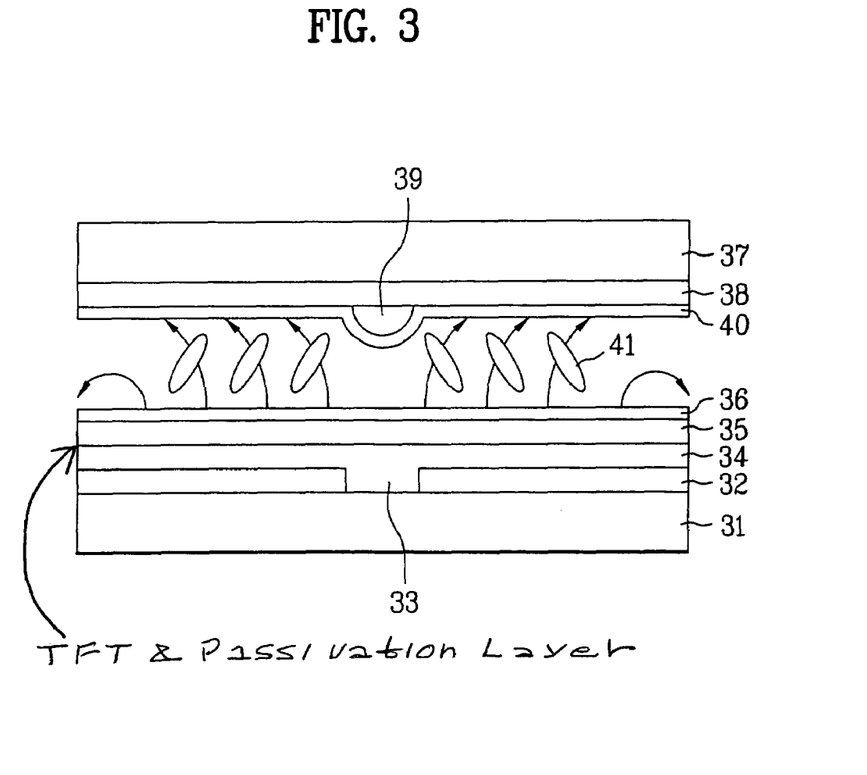
FIG. 3 is a cross-sectional view illustrating a unit pixel of a multi-domain LCD device according to an embodiment of the present invention.

FIG. 3 is a cross-sectional view illustrating a unit pixel of a multi-domain LCD device according to the present invention. Referring to FIG. 3, the multi-domain LCD device according to the present invention includes lower and upper substrates 31 and 37 being opposite to each other, and a liquid crystal layer 41 between the lower and upper substrates 31 and 37. The lower substrate 31 includes a color filter layer 32, an insulating layer 34 for planarizing the layers below, a plurality of gate and data lines, a thin film transistor (TFT), a passivation layer (not shown), a pixel electrode 35, and a first alignment layer 36.

First, the color filter layer 32 having an opening 33 is formed on the entire surface of the lower substrate 31, and the insulating layer 34 is formed on the entire surface of the lower substrate 31 including the color filter layer 32. Then, the plurality of gate and data lines are formed on the insulating layer 34 for being perpendicular to each other, thereby defining a plurality of pixel regions. The TFT having a gate electrode, a gate insulating layer, a semiconductor layer, an ohmic contact layer and source/drain electrodes is formed in this pixel region of the lower substrate 31. Subsequently, the passivation layer (not shown) is formed on the entire surface of the insulating layer 34 including the TFT, and the pixel electrode 35 is formed on the passivation layer for being connected to the drain electrode. Then, the first alignment layer 36 is formed on the entire surface of the lower substrate 31 including the pixel electrode 35.

The upper substrate 37 includes a black matrix layer (not shown), a common electrode 38, a protrusion 39 and a second alignment layer 40. At this time, the black matrix layer is formed for preventing light from leaking in the lower substrate corresponding the gate line, the data line and the TFT, and the common electrode 38 is formed on the entire surface of the upper substrate 37 including the black matrix layer. Then, the protrusion 39 is formed on the common electrode 38 and corresponds to the opening 33 of the lower substrate 31, and the second alignment layer 40 is formed on the entire surface of the upper substrate 37 including the protrusion 39.

In the multi-domain LCD device according to the present invention, the color filter layer 32 is formed on the lower substrate 31, and the opening 33 is formed by selectively etching the color filter layer 32. Then, the protrusion 39 is formed on the common electrode 38 of the upper substrate 37 to correspond to the opening 33 of the lower substrate 31, thereby obtaining the multi-domain LCD device. In one example, the opening 33 is simultaneously formed when forming the color filter layer 32, and then a VA mode is applied thereto, thereby obtaining a wide viewing angle. Meanwhile, the protrusion 39 of the upper substrate 37 is a dielectric structure, which is formed of a material having a dielectric constant same or less than that of the liquid crystal layer 41. For example, the protrusion 39 may be formed of photoacrylate or BenzocycloButene (BCB).

FIG. 4A to FIG. 4E are cross-sectional views illustrating manufacturing process steps of a multi-domain LCD device according to the present invention. These process steps may form the multi-domain LCD device of FIG. 3.

Figure 4A:
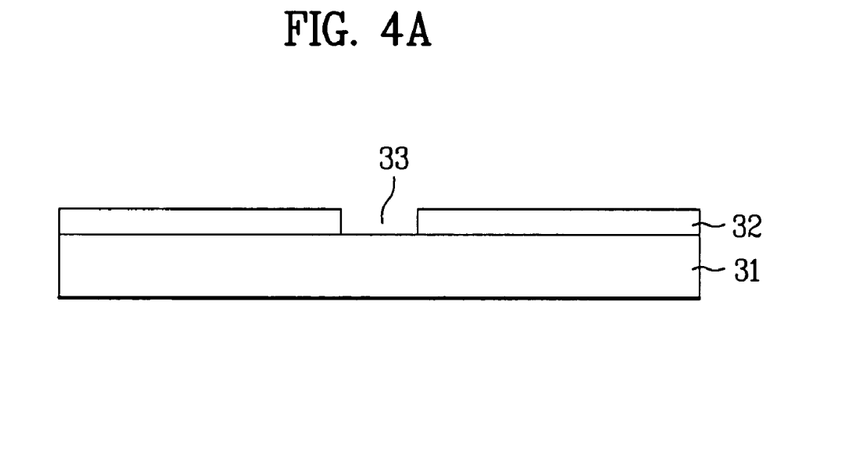

As shown in FIG. 4A, the color filter layer 32 and the opening 33 are formed on the lower substrate 31 at the same time. At this time, the color filter layer 32 is formed using a dye method, a pigment dispersion method, an electro-deposition method, a print method or other suitable method.

In the dye method, an exposure and developing process is performed to a dyeable and photosensitive resin, and then a dyeing process is performed thereto with a dyestuff. The pigment dispersion method is classified into two, one performing an exposure and developing process after depositing a photosensitive substance, to which a pigment is dispersed, and the other etching a polyimide substance having no photosensitivity, to which a pigment is dispersed, by using a photoresist. In the electro-deposition method, a highly polymerized resin is dissolved or dispersed from a solvent, and then extracted to an electrode by electrochemistry. The print method prints inks, to which a pigment is dispersed, on a resin.

Meanwhile, when forming the color filter layer 32, the opening 33 is simultaneously formed by selectively removing the color filter layer 32. At this time, a depth of the opening 33 formed in the color filter layer 32 can be controlled, thereby controlling light transmittance. That is, the opening 33 may be formed in a hole-shape or a trench-shape.

Figure 4B:
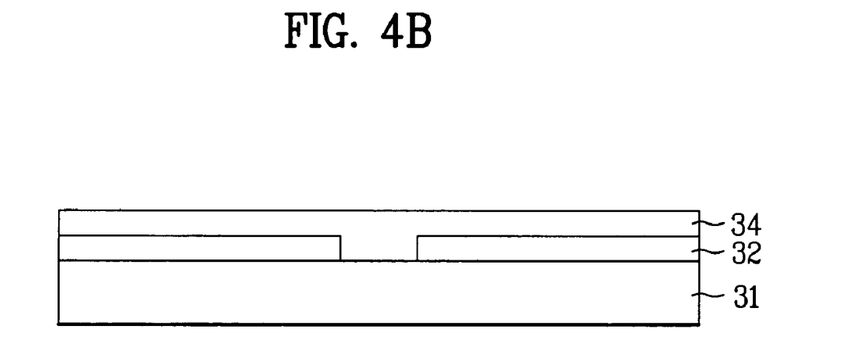

As shown in FIG. 4B, the insulating layer 34 for planarizing the layers below is formed on the entire surface of the lower substrate 31 including the color filter layer 32. Herein, the insulating layer 34 is formed of a silicon nitride layer, a silicon oxide layer, or other suitable material layer. In order to improve the aperture ratio of the LCD device, the insulating layer 34 may be formed of BenzocycloButene (BCB), acrylic resin, or polyimide compound.

Subsequently, the plurality of gate and data lines crossing each other are formed on the insulating layer 34 to define the plurality of pixel regions. The TFT having the gate electrode, the gate insulating layer, the semiconductor layer, the ohmic contact layer and the source/drain electrodes is formed in each of the pixel regions. After that, the passivation layer (not shown) is formed on the entire surface of the lower substrate 31 including the TFTs. The passivation layer is formed for protecting the TFTs from external moistures or foreign particles. That is, the passivation layer may be formed of any one of BenzocycloButene (BCB), Boron Phosphorous Silicate Glass (BPSG) and photo-polymer.

Figure 4C:
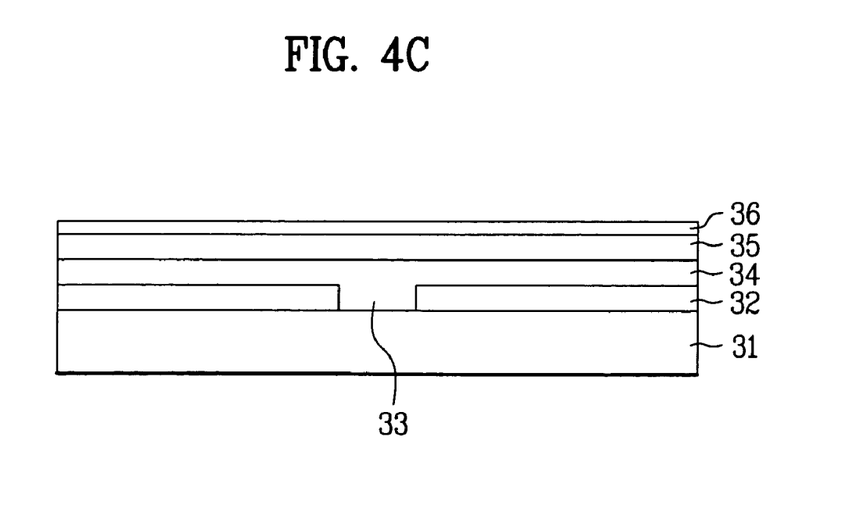

As shown in FIG. 4C, a metal layer is deposited on the passivation layer, and then selectively removed by photolithography, thereby forming the pixel electrode 35 (in the shown pixel region) being electrically connected to the drain electrode. At this time, the metal layer may be formed of Indium-Tin-Oxide (ITO), Indium-Zinc-Oxide (IZO), Indium-Tin-Zinc-Oxide (ITZO), Al, AlNd, Cr or Mo by a CVD method of sputtering. Subsequently, the first alignment layer 36 is formed on the entire surface of the lower substrate 31 including the pixel electrode 35. At this time, the first alignment layer 36 may be formed of polyimide or photo-alignment material.

In case of forming the first alignment layer 36 with the polyimide material, the alignment direction of the polyimide alignment layer 36 is determined according to mechanical rubbing. In case of forming the alignment layer 36 with the photosensitive material such as polyvinylcinnamate (PVCN) material or polysiloxane material, the alignment direction of the alignment layer 36 is determined by irradiation of ultraviolet rays. At this time, the alignment direction depends on light irradiation direction or light characteristics such as polarizing direction.

Figure 4D:
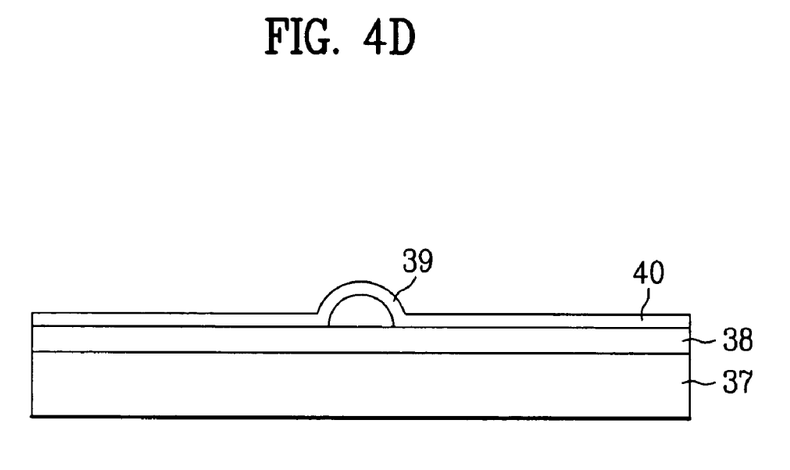

As shown in FIG. 4D, the upper substrate 37 is opposite to the lower substrate 31. The upper substrate 37 includes the black matrix layer (not shown) and the common electrode 38. At this time, the black matrix layer (not shown) is formed for preventing the light from leaking in the lower substrate 31 corresponding to the gate line, the data line and the TFT. The common electrode 38 is formed on the entire surface of the upper substrate 37 including the black matrix layer. Herein, the black matrix layer may be formed of any one of chrome Cr, oxide chrome CrOx and nitride chrome CrNx. Also, the black matrix layer may be formed as a dual-structure layer. For example, the black matrix layer may be formed as the dual-structure layer of chrome and oxide chrome, or chrome and nitride chrome.

Next, the dielectric layer is formed on the entire surface of the upper substrate 37 including the common electrode 38, and then selectively removed by photolithography, thereby forming the dielectric protrusion 39 to be corresponding to the opening 33 of the lower substrate 31. The dielectric protrusion 39 may be formed of any one of acrylic resin, BenzocycloButene (BCB) and black resin. The second alignment layer 40 is then formed on the entire surface of the upper substrate 37 including the dielectric protrusion 39.

Figure 4E:
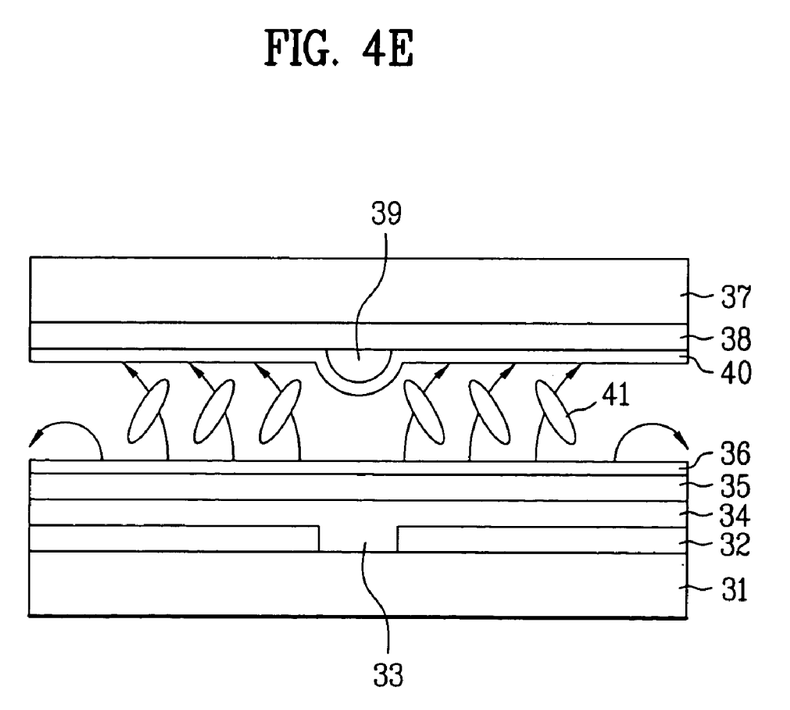

As shown in FIG. 4E, the liquid crystal layer 41 is formed between the lower and upper substrates 31 and 37. At this time, the liquid crystal layer 40 is formed in a liquid crystal dropping method including process steps of forming a seal pattern on the upper substrate 37, dropping the liquid crystal on the lower substrate 31, scattering ball spacers or forming column spacers on the upper substrate 37, bonding the lower and upper substrates 31 and 37 (having the structures shown in FIGS. 4C and 4D) to each other, and hardening the seal pattern. In addition to the liquid crystal dropping method, the liquid crystal layer may be formed between the lower and upper substrate 31 and 37 according to a known liquid crystal injection method.

Figure 5:
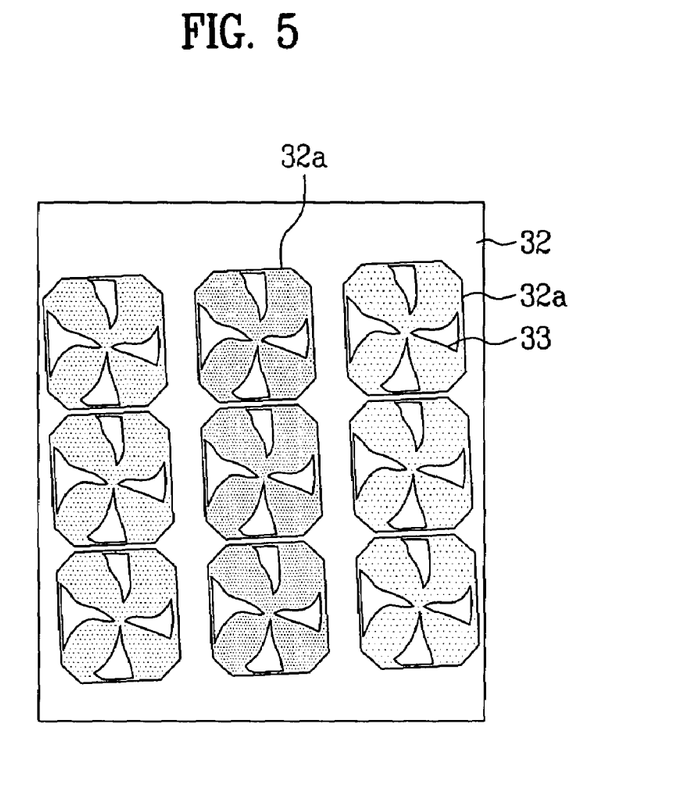
FIG. 5 is a top view illustrating an opening formed in a color filter layer according to the present invention.

FIG. 5 is a top view illustrating openings formed in a color filter layer of a multi-domain LCD device according to an embodiment of the present invention. As shown in FIG. 5, in this example, a plurality of openings 33 formed in the color filter layer 32 (having R/G/B color filters 32a) are formed in a pinwheel-shape, thereby improving light transmittance. In this case, there are protrusions in the upper substrate that correspond to these openings.

Figure 6:
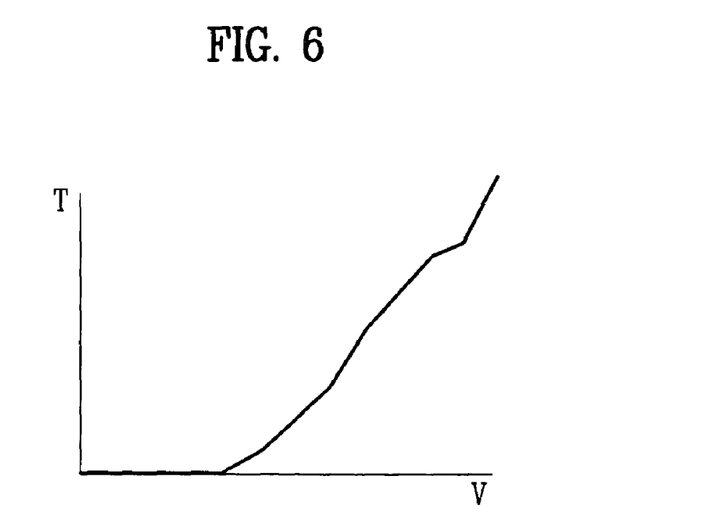
FIG. 6 is a graph illustrating a correlation between a voltage and a transmittance in a multi-domain LCD device according to an embodiment of the present invention.

FIG. 6 is a graph illustrating a correlation between a voltage and applied to the LCD device light transmittance in a multi-domain LCD device according to the present invention. Referring to FIG. 6, as the voltage V increases, the light transmittance T is improved.

In another embodiment of the present invention, after forming the thin film transistor on the lower substrate 31, the color filter layer 32 having the opening 33 is formed on the entire surface of the lower substrate 31 including the thin film transistor. Then, the insulating layer 34, the pixel electrode 35 and the first alignment layer 36 are formed on the entire surface of the lower substrate 31 including the color filter layer.

As mentioned above, the multi-domain LCD device and the method for manufacturing the same have at least the following advantages.

First, the multi-domain LCD device is obtained by forming the dielectric protrusion (39) and the opening (33), thereby forming the wide viewing angle and the peak transmittance characteristics. By applying the VA mode, the transmittance is improved at the portion forming the opening, thereby improving the peak transmittance without additional process steps. Also, the color filter layer and the opening are formed on the lower substrate, preventing the opening from being asymmetrical due to bonding margins.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A multi-domain liquid crystal display (LCD) device comprising:
   first and second substrates being opposite to each other;
   a color filter layer having an opening on the first substrate;
   an insulating layer on the first substrate including the color filter layer;
   a pixel electrode without an opening on the first substrate including the insulating layer;
   a first alignment layer on the insulating layer;
   a protrusion on the second substrate and corresponding to the opening of the color filter layer;
   a second alignment layer on the second substrate including the protrusion; and
   a liquid crystal layer between the first and second substrates.

2. The multi-domain LCD device of claim 1, further comprising:
   a thin film transistor between the insulating layer and the first alignment layer.

3. The multi-domain LCD device of claim 1, wherein the protrusion has a dielectric structure.

4. The multi-domain LCD device of claim 1, wherein the protrusion is formed of acrylic resin, BCB or black resin.

5. The multi-domain LCD device of claim 1, further comprising:
   a common electrode on the second substrate.

6. The multi-domain LCD device of claim 5, further comprising:
   a black matrix layer between the second substrate and the common electrode.

7. The multi-domain LCD device of claim 1, wherein the opening is formed in a pinwheel-shape.

8. The multi-domain LCD device of claim 1, wherein the insulating layer is formed of any one of silicon nitride, silicon oxide, BOB, acrylic resin and polyimide compound.

9. The multi-domain LCD device of claim 1, further comprising:
   a thin film transistor between the first substrate and the color filer layer.

10. A method for manufacturing a multi-domain liquid crystal display (LCD) device, comprising:
    providing first and second substrates being opposite to each other;
    forming a color filter layer having an opening on the first substrate;

forming an insulating layer on the first substrate including the color filter layer;

forming a pixel electrode without an opening on the first substrate including the insulating layer;

forming a first alignment layer on the insulating layer;

forming a protrusion on the second substrate and corresponding to the opening of the color filter layer;

forming a second alignment layer on an entire surface of the second substrate including the protrusion; and forming a liquid crystal layer between the first and second substrates.

11. The method of claim 10, further comprising:

forming a thin film transistor array on the insulating layer of the first substrate before forming the first alignment layer.

12. The method of claim 10, wherein the protrusion is formed of any one of acrylic resin, BCB and black resin.

13. The method of claim 10, further comprising:

forming a common electrode on an entire surface of the second substrate before forming the protrusion.

14. The method of claim 13, further comprising:

forming a black matrix layer between the second substrate and the common electrode.

15. The method of claim 10, wherein the liquid crystal layer is formed using a liquid crystal dropping method or a liquid crystal injection method.

16. The method of claim 15, wherein the liquid crystal layer is formed using the liquid crystal dropping method, and the liquid crystal dropping method includes process steps of forming a seal pattern on the second substrate, dropping liquid crystal on the first substrate, forming a spacer on the second substrate, bonding the first and second substrates to each other, and hardening the seal pattern.

17. The method of claim 10, wherein the insulating layer is formed of any one of silicon nitride, silicon oxide, BCB, acrylic resin and polyimide compound.

18. The method of claim 10, wherein, in the forming of the protrusion, the protrusion has a dielectric structure.

19. The method of claim 10, wherein in the forming of the opening, the opening has a pinwheel-shape.

20. The method of claim 10, further comprising:

forming a thin film transistor between the first substrate and the color filter layer.

21. A multi-domain liquid crystal display (LCD) device comprising:

first and second substrate being opposite to each other;

a color filter layer having an opening on the first substrate;

an insulating layer on an entire surface of the first substrate including the color filter layer;

a first alignment layer on the insulating layer;

a protrusion on the second substrate and corresponding to the opening of the color filter layer;

a second alignment layer on an entire surface of the second substrate including the protrusion; and a liquid crystal layer between the first and second substrates, wherein the opening is formed in a pinwheel-shape.

22. A method for manufacturing a multi-domain liquid crystal display (LCD) device, comprising:

providing first and second substrates being opposite to each other;

forming a color filter layer having an opening on the first substrate;

forming an insulating layer on an entire surface of the first substrate including the color filter layer;

forming a first alignment layer on the insulating layer;

forming a protrusion on the second substrate and corresponding to the opening of the color filter layer;

forming a second alignment layer on an entire surface of the second substrate including the protrusion; and forming a liquid crystal layer between the first and second substrates, wherein in the forming of the opening, the opening has a pinwheel-shape.

23. A multi-domain liquid crystal display (LCD) device comprising:

first and second substrates facing each other;

a color filter layer on the first substrate and having an opening;

a pixel electrode on the first substrate;

a protrusion on the second substrate and corresponding to the opening of the color filter layer; and a liquid crystal layer between the first and second substrates; and wherein the opening is formed in a pinwheel-shape.

* * * * *